United States Patent [19]

Pilarczyk et al.

[11] Patent Number: 5,788,329
[45] Date of Patent: Aug. 4, 1998

[54] FOLD-DOWN SEAT FOR A MOTOR VEHICLE

[76] Inventors: Ervin Robert Pilarczyk, 315 SE. 90th St., Ocala, Fla. 34480; Paul Barbee, 20561 Walnut St., Dunnelon, Fla. 34431; Larry E. Gray, 255 W. Main St., Brownsburg, Ind. 46112

[21] Appl. No.: 598,335

[22] Filed: Feb. 8, 1996

[51] Int. Cl.[6] ........................................ B60N 2/02
[52] U.S. Cl. .................. 297/354.13; 297/65; 297/85; 5/41; 5/37.1; 5/31
[58] Field of Search ............................ 297/354.13, 65, 297/300.1, 341, 362.11, 362.14, 64; 5/41, 42, 37.1, 13, 31, 32.1, 927

[56] References Cited

U.S. PATENT DOCUMENTS

| 2,740,131 | 4/1956 | Vogel et al. | 5/42 |
|---|---|---|---|
| 4,186,960 | 2/1980 | Mizelle | 297/65 X |
| 4,625,346 | 12/1986 | Quackenbush | 5/37.1 |
| 4,756,034 | 7/1988 | Stewart | 5/41 X |
| 5,419,611 | 5/1995 | Cook | 297/85 |

FOREIGN PATENT DOCUMENTS

| 547290 | 5/1956 | Belgium | 5/31 |
|---|---|---|---|
| 772525 | 8/1934 | France | 5/42 |

*Primary Examiner*—Laurie K. Cranmer
*Attorney, Agent, or Firm*—Leydig, Voit & Mayer Ltd.

[57] ABSTRACT

A fold-down seat frame for a motor vehicle is provided. The seat includes a seat bottom disposed in a predominantly horizontal position and a seat back adapted for movement between a predominantly vertical seating position and a predominantly horizontal reclined position. The seat back and seat bottom share an adjacent edge that forms a vertex between the two. An auxiliary section is adapted for movement between a seated position and a reclined position. When in the seated position, the auxiliary section is located substantially below the seat bottom, and when in the reclined position, the auxiliary section is interposed between the seat back and seat bottom and aligned in substantially horizontal fashion therewith. A hinging assembly interconnects the seat back, and the seat bottom, and the auxiliary section and operates to controllably and concertedly move the seat back, the seat bottom, and auxiliary section between the seated and reclined positions.

8 Claims, 5 Drawing Sheets

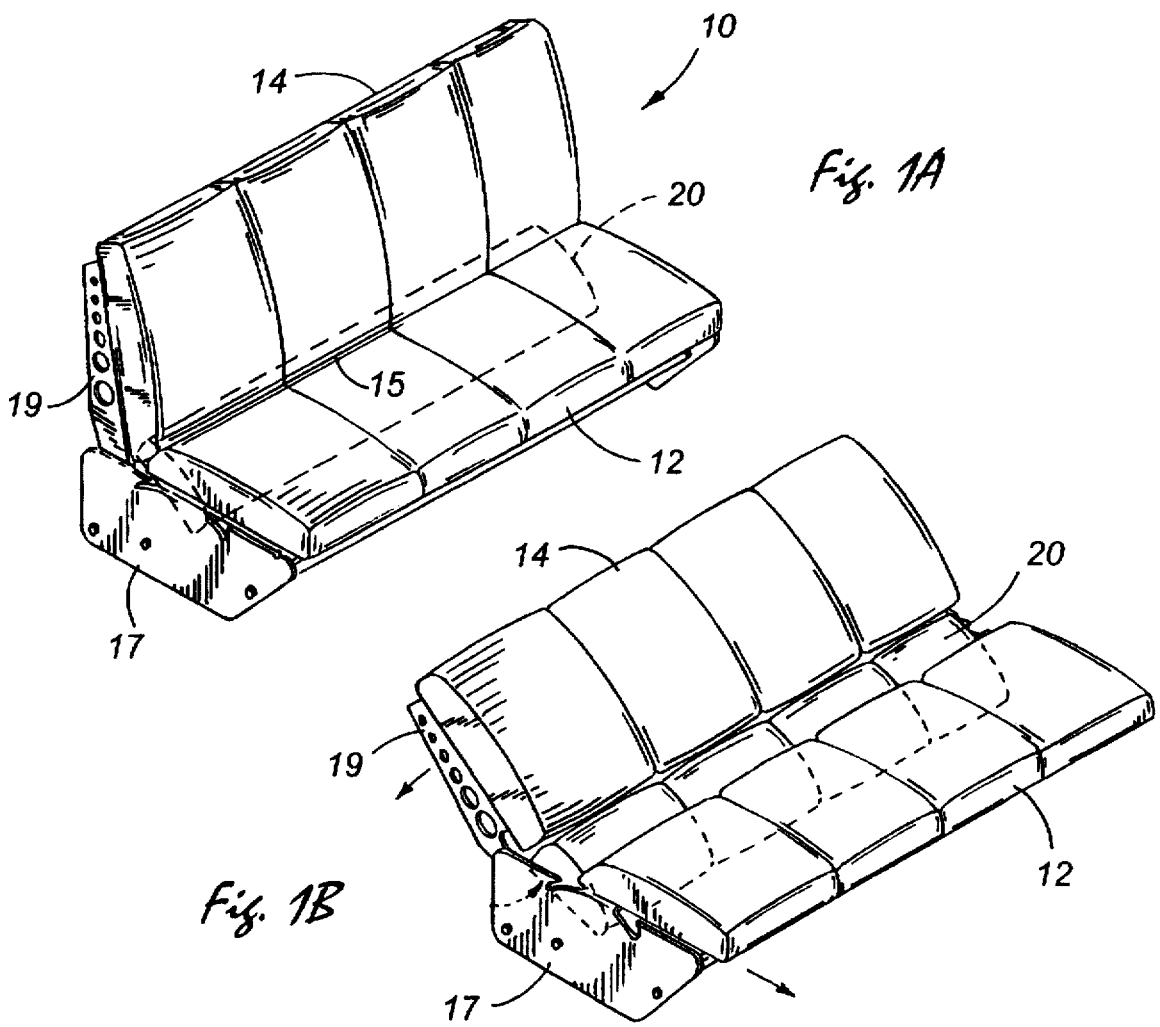
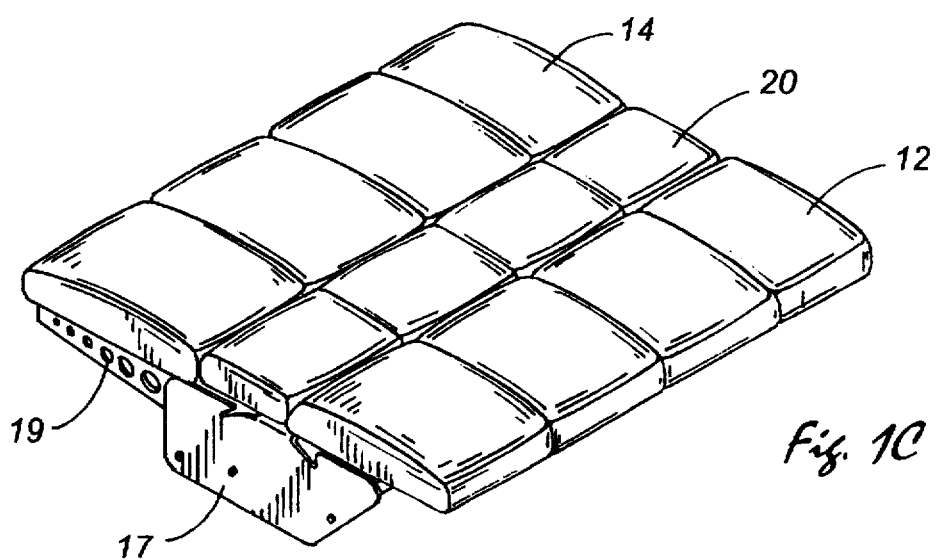

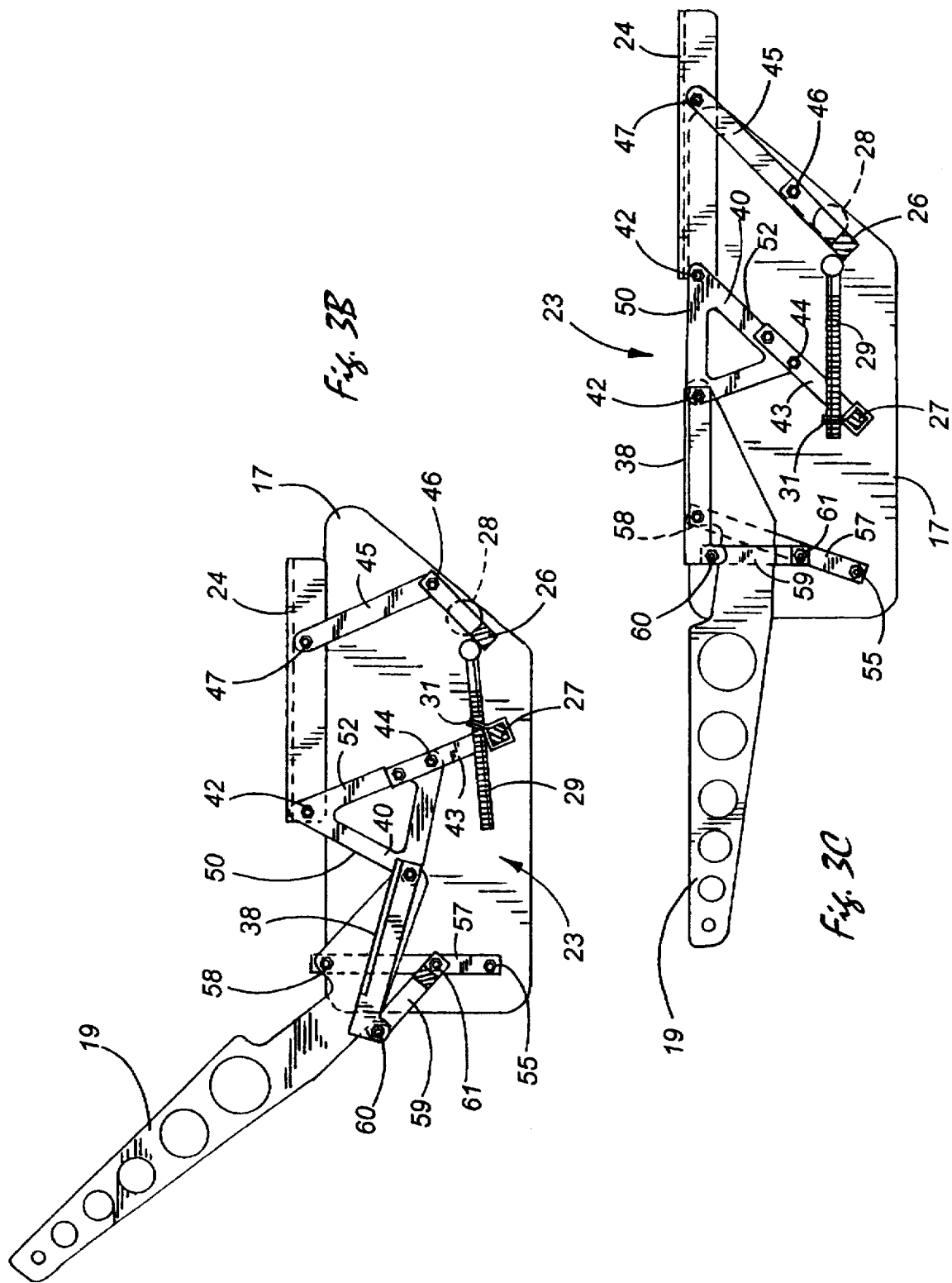

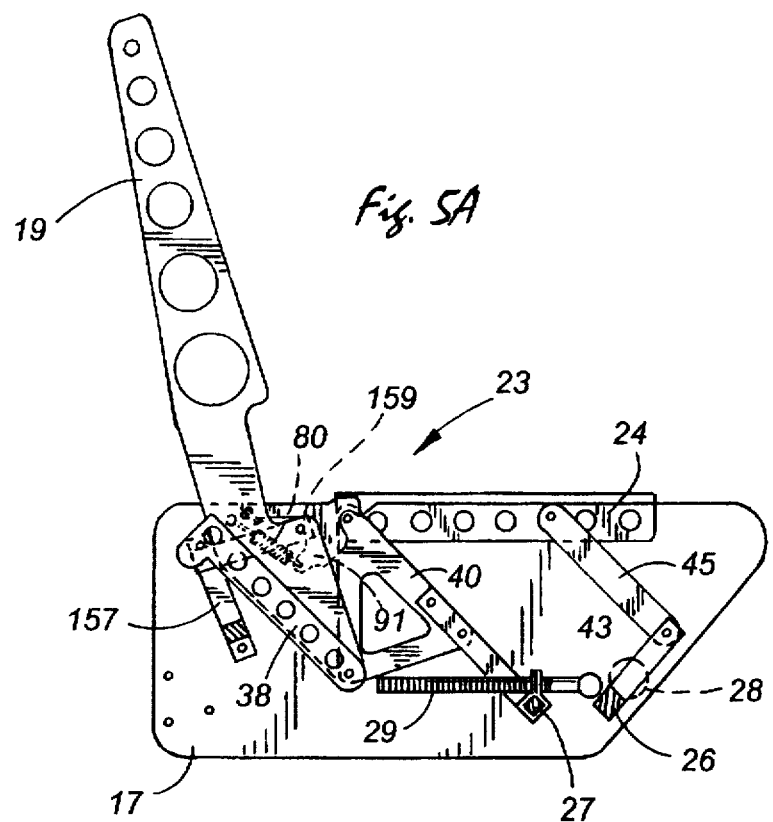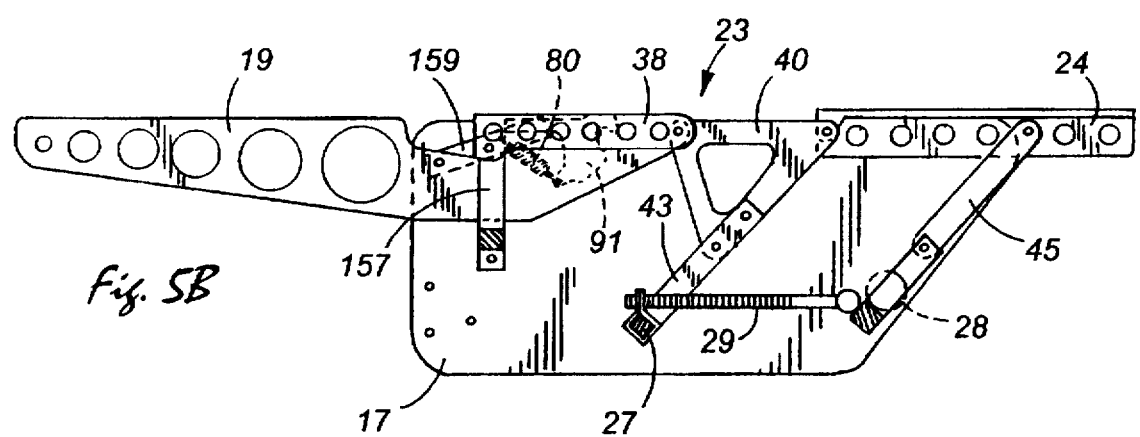

FOLD-DOWN SEAT FOR A MOTOR VEHICLE

BACKGROUND OF THE INVENTION

1. Field of the Invention

The present invention relates generally to reclining seats for motor vehicles, and more particularly to reclining seat-beds for motor vehicles.

2. Description of the Prior Art

In recent years, there has been a vast proliferation in the automotive industry of vans and mini-vans. Indeed, competition in the marketplace for these vehicles is intense. In this particular niche (i.e., the vans and mini-vans), a competitive edge is often gained by providing amenities over and above those offered by competitors. Built-in television sets and child safety seats that fold out from the passenger seats are examples of amenities presently provided in these vehicles.

Another feature often provided in the conversion van and mini-van market is the provision of a fold-out or fold-down seat-bed. Upgraded bench seats are known which include an auxiliary cushion or section; in addition to the normal seat back and seat bottom, when the seat is disposed in an upright or seated position, the auxiliary section is located in a storage position. When, however, the seat back is reclined to a position flush with the seat bottom, the auxiliary section is extended into horizontal alignment with the flattened seat back and seat bottom.

More specifically, at least one bench seat is often provided in both conversion vans and mini-vans. Typically, a seat bottom is disposed in a generally horizontal position and forms an angle with a seat back generally disposed in an upright or predominantly vertical position. The seat bottom and seat back share an adjacent edge forming a vertex between the seat bottom and seat back. In upgraded model vehicles, folddown seat-beds are often provided, whereby an auxiliary section of cushion is hingedly attached to the seat back and disposed for pivotal movement in relation therewith. When the seat is disposed in its upright position, the auxiliary section is typically located in a storage position immediately behind the seat back.

An extendible support assembly is provided in connection with the auxiliary section to pivot the auxiliary section relative to the seat back and extend it into a reclined position, while at the same time providing adequate structural support to support the weight of a person or two with the assembly extended. It is appreciated that the extension/support assembly is designed to be responsive to, or to move in concert with, the seat-back as the seat-back is pivoted with respect to the seat bottom. That is, the seat is moved from its upright to its reclined position by pivoting the seat-back with respect to the seat bottom so that the two are horizontally disposed substantially flush with one another. In this regard, the adjacent edge shared between the seat-back and the seat bottom remains so positioned or shared as the seat-back pivots from its upright to reclined position. At the same time, as the seat-back is pivoted to its reclined position the support/extension assembly pivots the auxiliary section from its storage position immediately behind the seat-back toward an extended position, wherein the auxiliary section, the seat-back, and the seat bottom are aligned in a substantially horizontal position to form a bed.

The extension/support assembly is presently provided in the form of a collection of mechanical linkages that move in relation to one another between extended and storage positions. Several shortcomings are identified in fold-down seat-beds of this type. One shortcoming relates to the forward motion of the seat as the seat-back and auxiliary section are extended into the reclined position. Specifically, these seat-beds are typically provided in the rearmost seating position of a van. As the seat-back folds downwardly (and rearwardly) and the auxiliary section extends out therefrom, and also rearwardly, it is known that the auxiliary section often contacts and therefore jams against the back wall of the vehicle. Therefore, the entire seat assembly must be adjusted forwardly to provide room for the seat-back and auxiliary section to properly extend. This requires either manual adjustment of the seat forwardly or, if the seat is motor driven, a separate motor to advance the seat.

Another shortcoming noted in these seat-beds relates to the movement of the seat sections and the extension/support assembly. Certain models of these seat-bed assemblies are provided with a motorized drive mechanism to move the seat between upright and reclined positions. Due to the relatively complex movements of the seat-back pivoting with respect to the seat bottom, and the extension assembly pivoting the auxiliary section with respect to the seat-back, frequently two or more drive motors are provided for moving the seat between seating and reclined positions. This not only adds to the cost of the system but also introduces another component (the added motor) subject to failure and replacement.

A further shortcoming noted in these types of seat assemblies relates to the configuration of the extension/support assembly. As previously mentioned, these assemblies generally take the form of mechanical linkages configured to extend and retract so as to pivot the auxiliary section with respect to the seat-back. A number of pinch points are noted in the linkages, which increase the potential dangers to children or other persons which may get a finger or other object caught as the seat is extended and retracted.

SUMMARY OF THE INVENTION

Accordingly, a primary object of the present invention is to provide an improved fold-down seat-bed for an automotive vehicle, having a simpler design and construction.

Another object of the present invention is to provide a fold-down seat-bed for an automotive vehicle that is configured to avoid contacting or jamming against the back wall of the vehicle.

Another object of the present invention is to provide a fold-down seat having improved reliability and reduced manufacturing costs.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention is generally directed to a fold-down seat for a motor vehicle. The seat includes a seat bottom and a seat back, configured to concertedly move between an upright seated position and a reclined position. In the seated position, the seat bottom is disposed in a predominately horizontal position while the seat back is disposed in a predominately vertical position. While in the seated position, the seat back and seat bottom share an adjacent edge that forms a vertex between the seat back and seat bottom. While in the reclined position, however, the seat back and seat bottom are spaced apart, yet are substantially aligned and horizontally disposed. An auxiliary section is provided and adapted for movement between a seated position and a reclined position. When in the seated position, the auxiliary section is disposed in a storage location substantially below the seat bottom. When in the reclined position, the auxiliary section is substantially aligned and horizontally disposed with the seat back and seat bottom, and interposed therebetween. A hinging means is provided that interconnects the seat bottom, the seat back, and the auxiliary section so as to controllably and concertedly move the three seat portions between the seated and reclined positions.

In accordance with another aspect of the present invention, a fold-down seat is provided with a hinging means adapted to move the seat bottom, seat back and auxiliary sections between a seated position and a reclined position by moving the assembly through a complex path. Translating through this path, the seat back pivots downwardly and rearwardly while the seat bottom advances forwardly, in a substantially linear motion. At the same time, the auxiliary section swings upwardly from a stored position underneath the seat into a position interposed between the seat back and seat bottom. The hinging means insures that the movement between each of these sections is concerted, and in the reclined position, the three sections are aligned and substantially horizontally disposed.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIGS. 1A–1C illustrate a fold-down seat in upright, intermediate, and reclined positions, respectively;

FIGS. 3A–3C show side views illustrating the movement of the seat and hinging assembly between the upright, intermediate, and reclined positions, respectively;

FIGS. 5A–5B are views similar to FIGS. 3A–3C, respectively, illustrating an alternative embodiment of the present invention.

DETAILED DESCRIPTION OF THE PREFERRED EMBODIMENT

Figure 2:
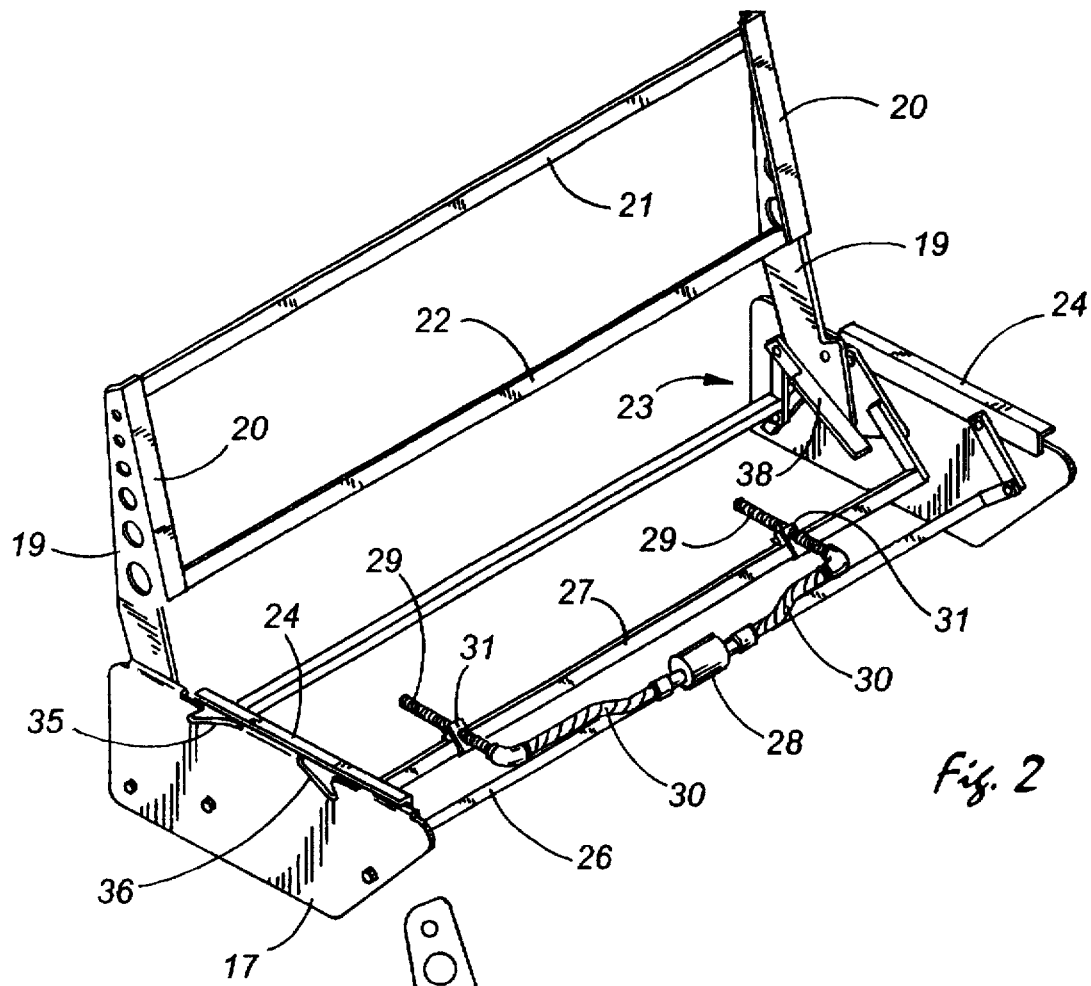
FIG. 2 is a perspective view of the fold-down seat illustrated in FIG. 1, with the cushions omitted to illustrate the frame assembly.

Turning now to the drawings, FIGS. 1A–1C show perspective views of a fold-down seat in an upright or seating position (FIG. 1A), an intermediate position (FIG. 1B), and a reclined position (FIG. 1C). The seat, generally designated by reference numeral 10, comprises a seat bottom 12 that is substantially horizontally disposed. A seat back 14 is disposed in a predominantly upright or vertical disposition and shares a common edge 15 with the seat bottom 12. The shared end 15 forms a vertex between the seat bottom 12 and seat back 14, when disposed in the upright position of FIG. 1A. It will be appreciated that the angle formed between the seat bottom 12 and the seat back 14 is slightly greater than 90°, to provide a comfortable seating position.

As will be understood from the description that follows, the present invention includes a mechanism for folding down the seat back 14 with respect to the seat bottom 12. In this regard, a back support 19 is fixedly attached to the seat back 14 to support and carry the seat back between upright and reclined positions. To this end, the seat back 14 translates through a complex path having both a pivotal element of motion, as well as a linear element of motion, with respect to the seat bottom 12. A hinging assembly (described below) is provided to facilitate the movement of the seat back 14 between seated and reclined positions. Side plates 17 are disposed on each end of the seat 10 and serve to support the seat bottom 12, provide structural support for the hinging assembly, and also enhances safety features of the seat 10. In this regard, pinch points that may otherwise be present by virtue of the relative component movement within the hinging assembly are protectively covered by side plates 17, which therefore protect articles from getting caught between components moving relative to another.

The back supports 19 are illustrated as having circular cutouts. It has been found the resulting structure is sufficiently strong to provide adequate structural support, yet the cutouts substantially reduce the weight of the seat 10.

It is appreciated that the back supports 19 and side plates 17 mentioned above are symmetrically disposed on both ends of the seat 10. Indeed a number of components that will be discussed herein are symmetrically disposed in this fashion. To simplify the discussion that follows, the description provided herein will generally reference only one side or set of such components. It is understood, however, that the operation of the seat in translating between upright and reclined positions demands the cooperation of components symmetrically disposed on both sides. Therefore, when reference is made to the structure, function, or operation of a particular component having a symmetrically disposed counterpart, it will be understood that the description provided applies to both of such components.

In keeping with the description of the invention, an auxiliary section 20 is provided (shown in phantom in FIG. 1A) and is disposed in a storage position when the seat 10 is in its upright or seated position. Preferably, the storage position is predominantly below the seat 10. As shown in FIGS. 1B and 1C, as the seat 10 is translated from its upright to reclined position, the seat back 14 pivots downwardly and rearwardly with respect to the side plates 17. At the same time, the seat bottom 12 advances substantially linearly and forwardly, and the auxiliary section 20 swings into an intermediate position between the seat back 14 and seat bottom 12. In the further reclined position of FIG. 1C, the seat back 14, seat bottom 12 and auxiliary section 20 are substantially aligned and horizontally disposed to form a bed. In this configuration, the seat back 14 and seat bottom 12 are spaced apart and the auxiliary section 20 is interposed therebetween. It has been found that this seating configuration realizes several advantages and advancements over existing convertible seat/bed assemblies. For example, it has been found that the motion translating the seat 10 between upright and reclined positions is more fluid, wherein the seat bottom 12 advances forwardly in concert with the downward and rearward pivotal movement of seat back 14. Moreover, the weight from the seat back 14 as it is translated downwardly, is in part translated to the auxiliary section 20 to assist in swinging it upwardly into its final, interposed position between seat back 14 and seat bottom 12.

Another benefit or advantage that flows from the rather unique and dynamic movement of the seat 10, relates to the forward movement of seat bottom 12. As it was previously mentioned, fold-down seats in the prior art operated by pivoting the seat back downwardly, while extending an auxiliary section in an upwardly and rearwardly pivotal direction therefrom. This often created an interference problem with the back wall of the vehicle, wherein the entire seat had to be advanced forwardly. In the present invention, the hinging assembly, which will be described in more detail below, operates to automatically advance the seat bottom 12 forward to make space for the auxiliary section 20. The seat back 14 merely pivots downwardly and rearwardly with respect to side plates 17, and there is no need for advancing the entire seating assembly 10 forward. Moreover, by virtue of the hinging assembly interconnecting the seat back 14, seat bottom 12 and auxiliary section 20, downward motion of the seat back 14 assists in the elevation of auxiliary section 20 from its storage to active or reclined positions. It is thus found that the efficient operation of the present invention realizes substantial advancements over the prior art known to applicants.

Turning now to FIG. 2, a perspective view of the seat 10 disposed in its seating position is shown. In this figure, however, the cushions have been omitted to illustrate the essential hinging and frame components that comprise the preferred embodiment. In this regard, it is significant to note that the applicants regard the present invention as being directed to the frame, and the cushions are not deemed as an essential element thereof. Indeed, it is contemplated that the frame for the seat 10 will be manufactured and sold separately to vendors who will later install the seat cushions.

As described in connection with FIG. 1, the side plates 17 and back supports 19 are provided to support and carry the seat bottom 12 and seat back 14. The back supports 19 each include a flanged portion 20 which provides a good surface for mounting, as by bolts or screws, the seat back 14 onto the back support 19. Laterally extending slats 21 and 22 enhance the structural integrity of the seat back 14 and may also carry mounting bolts and screws.

The hinging assembly 23, which will be described in more detailed connection with FIGS. 3A–3C, includes a number of brackets and linkages that dictate the movement and operation of the seat 10 between upright or seated and reclined positions. Angle irons 24 connected to the hinging assembly 23 are adjacently disposed with side plates 17. These angle irons 24 form a platform or support for a seat bottom 12, to which the seat bottom 12 may be bolted or otherwise attached. The angle irons 24 are further adapted to be carried by the hinging assembly 23 for a linear gliding motion across the top of the side plates 17. In this way, the angle irons 24 serve to carry the seat bottom 12 forwardly and rearwardly as the seat 10 is translated between its reclined and upright positions respectively.

A cross arm 26 is fixedly attached to the side plates 17 and extends laterally therebetween. Similarly, a drive bar 27 is disposed substantially parallel to the cross arm 26, and is connected to the hinging assembly 23 and adapted for movement relative to the side plates 17. A motor 28 is attached to the cross arm 26 and centrally disposed between side plates 17. The motor 28 is operably connected to drive screws 29 via cables 30. In a manner that is known and understood, rotary motion from the shaft of the motor 28 is translated through the cable 30 so as to rotate drive screws 29. Near one end, the drive screws 29 are fixedly attached to the cross arm 26 in such a manner that, while rotary motion of the drive screw 29 is permitted, the drive screws 29 are linearly fixed in relation to the cross arm 26. The drive screws 29, however, are threadedly attached in relation to the drive bar 27. Specifically, a bracket 31 attached to the drive bar 27 threadedly receives the drive screws 29. As the drive screws 29 rotate, the drive bar 27 is advanced either forwardly or rearwardly along the shaft of the drive screws 29, depending upon the rotary direction of the drive screws 29.

In this way, rotation of the motor 28 in a first direction advances the drive bar 27 away from the cross arm 26. Conversely, rotation of the motor 28 in the opposite direction pulls the drive bar 27 into closer proximity with the cross arm 26. As will be appreciated from the description of the hinging assembly 23 provided in connection with FIGS. 3A–3C, advancement and retraction of the drive bar 27 is all that is required to translate the seat 10 between upright and reclined positions. It is noted that the extremely efficient design and operation of the hinging assembly 23 in the present invention provides a substantial advancement over the prior art insofar as the motions translating the seat 10 between upright and inclined positions is extremely efficient and may be achieved by a single drive motor 28. Prior art devices typically require two or more motors due to the movements required to translate the seat between upright and reclined positions, through less efficient assemblies.

While the illustrated embodiment utilizes a motor 28 and drive screws 29 to provide the motivating force for moving the seat 10 between upright and reclined positions, consistent with the concepts and teachings of the present invention, a manually operated seat 10 may also be provided. In this regard, the side plates 17 have been illustrated as having arcuately shaped slots 35 and 36. While the slots serve no function on the illustrated embodiment, it is contemplated that a manual release lever may be provided in this space. In the illustrated embodiment, the motor 28 may be operated by an electrical switch (not shown) configured to apply power to rotate the motor 28 in first or second directions and also shut power to the motor 28 off. When the motor 28 is shut off, the drive screws 29 are held in a fixed position and therefore the seat 10 is rigidly held in position. However, in a manually operated seat 10, the motor 28 and drive screws 29 would be eliminated. Therefore, it would be necessary to provide a manually operated latching and release means. The latching means would serve to fixedly engage the hinging assembly 23, or at least some component connected therewith, to hold the seat 10 in a fixed position. Upon release of the latch, however, the seat 10 may be translated from its upright to reclined position by manually directing the seat back 14 toward its reclined position. By virtue of the hinging assembly 23, the seat bottom 12 would automatically and concertedly advance forward, while the auxiliary section 20 would likewise be directed into its interposed position. Conversely, lifting up on the seat back 14 will direct the auxiliary section 20 from its interposed position to its storage position, predominantly below and beneath the seat bottom 12, and move the seat bottom 12 rearwardly, so as to translate the seat 10 from its reclined to its upright position.

A return spring may also be included to assist the movement of the seat from its reclined position to the upright position. To better illustrate the mechanical linkages that comprise the hinging assembly, the return spring has not been shown in connection with FIGS. 3A–3C. It is sufficient to note that the spring is preferably extended between the middle of link 45 and point 44. However, brief reference is now made to FIGS. 4A and 4B, which illustrate a return spring 80 in connection with a seat latch 82 that releasably holds the seat in the seating position.

More specifically, a seat latch 82 is pivotally attached to one of the side plates 17 at 84. One end of the return spring 80 is attached to a nose 86 of the seat latch 82, and the other end of the return spring 80 is attached to the seat side plate 17 at 87. The seat latch 82 also has a hook 89 that grips a pin 88 on the support 24 for the seat bottom 12. This prevents forward motion of the seat bottom 12, and thus latches the seat in its upright position. A release mechanism is provided to release the seat latch 82. Preferably, a cable 90 (only a portion shown) is attached to a rear extension 91 of the seat latch 82. A downwardly directed force on the cable 90 pivots the seat latch 82 as shown in phantom in FIG. 4B. This releases the grip of the hook 89 on pin 88, and therefore allows the seat bottom 12 to move forwardly, and the seat back 14 to pivot rearwardly. The return spring 80 also serves to pivot the seat latch 82 back to the position shown in FIG. 4A, when the cable 90 is released. It will be appreciated that in some embodiments the seat latch 82 may not be necessary, as the motor 28 and drive screws 29 may provide sufficient locking force to maintain the seat in its seating position.

Figure 3A:
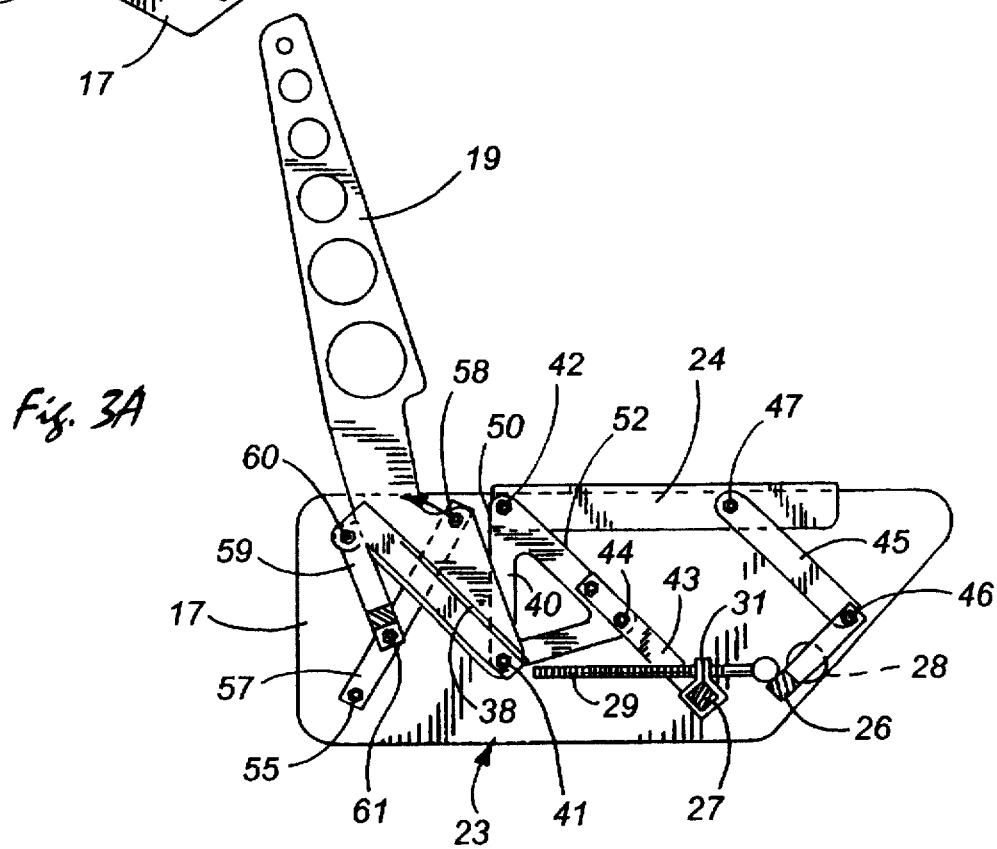
Figure 4A:
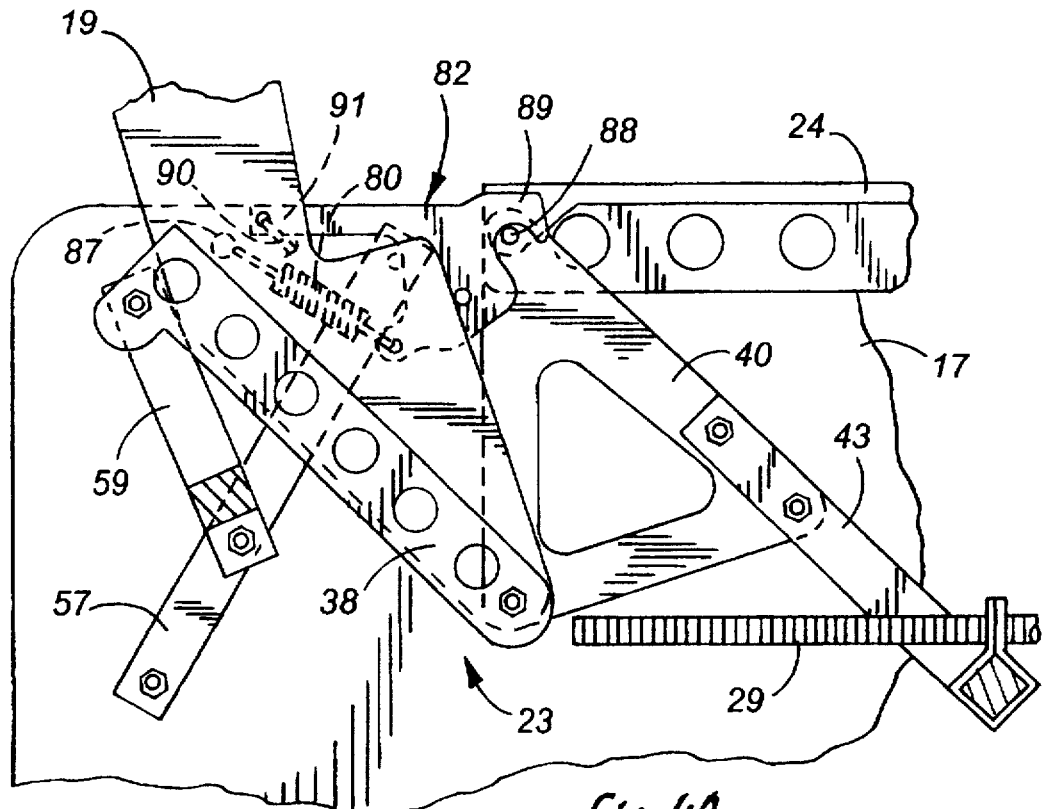
FIGS. 4A–4B illustrate the linkage mechanism as in FIGS. 3A–3B, respectively, modified to include a return spring.
Figure 4B:
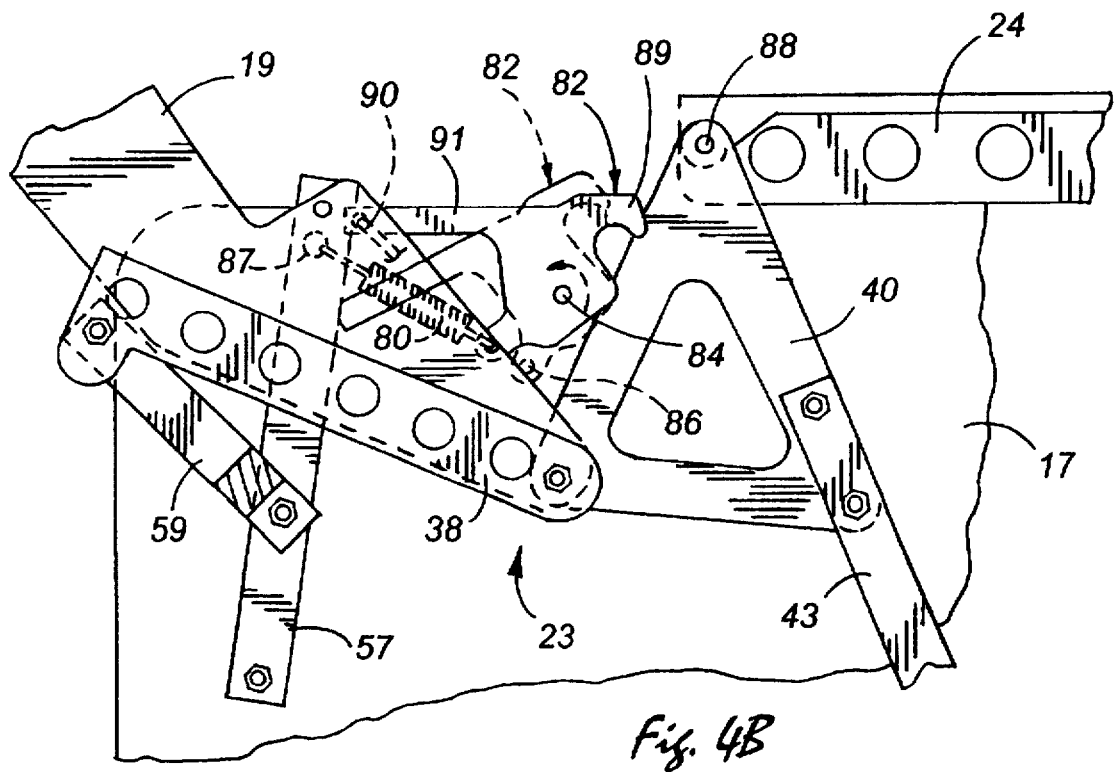

In keeping with the description of FIGS. 3A-3C, a flange 38 forms a support for carrying the auxiliary section. This support 38 is connected to the hinging assembly 23 so as to move between storage and active, or interposed, positions. In this regard, FIGS. 3A-3C illustrate the operation of the hinging assembly 23.

At the heart of the hinging assembly 23 of the illustrated embodiment is a triangular-shaped bracket 40. One vertex of the bracket 40 is pivotally attached at 41 to a lower lobe of the back support 19. One end of the auxiliary support 38 is also pivotally attached at this same point 41. A second vertex 42 of the bracket 40 is pivotally attached between the angle iron 24, which forms the support for the seat bottom 12. Finally, a linkage 43 is rigidly attached between the drive bar 27 and the third vertex 44 of the bracket 40. As the seat 10 translates between its upright and reclined positions, it is seen that the bracket 40 rotates approximately 90°. More specifically, a first side 50 of the bracket 40, is substantially vertically disposed, when the seat 10 is in its upright position (see FIG. 3A). As the seat 10 translates from upright to reclined positions, the bracket 40 moves upwardly and rotates approximately 90°, so that the edge 50 is substantially horizontally disposed when the seat 10 is in its fully reclined position. It is seen, as illustrated in FIGS. 3A-3C, that the drive screws 29 motivate this action by their linear advancement with respect to drive bar 27. That is, FIGS. 3A-3C show relative degrees of advancement of the drive screw 29 in relation to the drive bar 27. As the drive bar 27 is advanced, it advances the link 43 which rotates the bracket 40 by virtue of its fixed attachment therewith. The movement of the bracket 40, in turn, motivates the movement of the remainder of the components supporting and carrying the cushioned sections of the seat 10.

Linkage 45 is pivotally attached to the side plates 17 at 46, and extends between pivot point 46 and angle iron 24 where it also forms a pivotal attachment at 47. It is significant to note that the length of linkage 45 is substantially equal to the length of side 52 of bracket 40, and is disposed substantially parallel therewith. As bracket 40 rotates through its range of motion, so as to vary the angular disposition of side 52, linkage 45 remains in parallel relationship therewith throughout the range of motion. In this way, angle iron 24, which forms the support for seat bottom 12, is carried by bracket 40 and linkage 45 between rearward and forward positions, and maintains a substantially horizontal disposition throughout that range of motion. Thus, the substantial identity in length and disposition between side 52 of bracket 40 and link 45 are a significant feature of the illustrated embodiment.

Turning now to the seat back 14, the back supports 19 are attached to the side plate 17 at pivot point 55. More specifically, a link 57 is pivotally attached at one end 55 to the side plate 17 and at the other end to the back support 19.

A second link 59 is pivotally attached at 60 and 61 between the back support 19 and link 57. It is seen that the pivot point 60 is shared among link 59, back support 19 and auxiliary support 38.

Having described the respective pivotal and fixed connections between the mechanical components comprising the illustrated embodiment, and rather describe in exhausting detail, reference is now made to FIGS. 3A-3C to embellish the particular interrelated and concerted movement of these various components. As previously mentioned, the motivating force is provided by the drive screws 29 acting upon the triangular bracket 40 by way of linkage 43. It will be appreciated that beyond what has been described above, the particular and relational dimensions and dispositions of the various pivot points of the illustrated embodiment may be obtained from the drawings provided herewith and from practicing the present invention.

FIGS. 5A and 5B show an alternative embodiment of the present invention. This embodiment is substantially similar to that of FIGS. 3A-3C, except that mechanical links 57 and 59 (FIGS. 3A-3C) have been repositioned as shown in FIGS. 5A and 5B as 157 and 159. It has been found that this positioning of links 157 and 159 provide an improved kinematic motion to seat back 14.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A fold-down seat frame for a motor vehicle comprising:
   a seat bottom disposed in a predominately horizontal position;
   a seat back adapted for movement between a predominately vertical seating position and a predominately horizontal reclined position, the seat back having an edge disposed adjacent to an edge of the seat bottom when in the seating position, the edges being spaced apart when the seat back is disposed in the reclined position;
   an auxiliary section adapted for movement between a seating position and a reclined position, the auxiliary section being substantially horizontally disposed and interposed between the spaced apart edges of the seat back and seat bottom when in the reclined position, the auxiliary section being disposed predominantly below the seat back and the seat bottom when in the seating position, the auxiliary section being disposed partially behind the seat bottom and the seat back, when in the seating position; and
   hinge means interconnecting the seat back, the seat bottom and the auxiliary section, the hinge means controllably and concertedly moving the seat back and the auxiliary section between the seating the reclined positions.

2. The fold-down seat according to claim 1, wherein the hinge means is operative to move the auxiliary section upward in relation to the seat back and the seat bottom as the auxiliary section is moved from the seating position to the reclined position.

3. A fold-down seat for a motor vehicle comprising:
- a seat bottom disposed in a predominately horizontal position;
- a seat back adapted for movement between a predominately vertical seating position and a predominately horizontal reclined position, the seat back having an edge disposed adjacent to an edge of the seat bottom when in the seating position, the edges being spaced apart when the seat back is disposed in the reclined position;
- an auxiliary section adapted for pivotal movement between a seating position and a reclined position, the pivotal movement encompassing a range of motion of less than 180°, the auxiliary section being predominately disposed between the seat back and seat bottom when in the seating position, auxiliary section being substantially horizontally disposed and interposed between the spaced apart edges of the seat bottom and seat back when in the reclined position; and
- a hinging means for translating the seat between the seating and reclined positions, the hinging means configured to define a complex translational path of the seat back relative to the seat bottom.

4. The fold-down seat according to claim 3, wherein the complex path includes a pivotal component of movement.

5. The fold-down seat according to claim 4, wherein the complex path includes a linear component of movement.

6. A fold-down seat for a motor vehicle configured to move between seated and reclined positions, the seat comprising:
- a seat back and a seat bottom disposed in angular relation to form a vertex at a common edge, when in the seated position;
- an auxiliary section disposed outside the angle formed between the seat back and the seat bottom, the auxiliary section being predominantly disposed below the seat back and seat bottom when in the seating position; and
- hinging means interconnecting the seat back, the seat bottom, and the auxiliary section for concertedly moving the seat between the seated and reclined positions, the hinging means being configured to pivot the seat back downwardly and rearwardly, advance the seat bottom forwardly, the hinging means being further configured to pivot the auxiliary section to a position interposed between the seat back and the seat bottom, when moving the seat from the seated to the reclined position, the auxiliary section adapted to pivot from the seated position to the reclined position through a range of motion of less than 180°.

7. The fold-down seat according to claim 6, further including motorized drive means for motivating the seat between the seated and reclined positions.

8. The fold-down seat according to claim 7, wherein the drive means acts upon the hinging means to motivate the movement of the seat.

\* \* \* \* \*